J. R. Van Marter.
Still.
N° 89,449.  Patented Apr. 27, 1869.
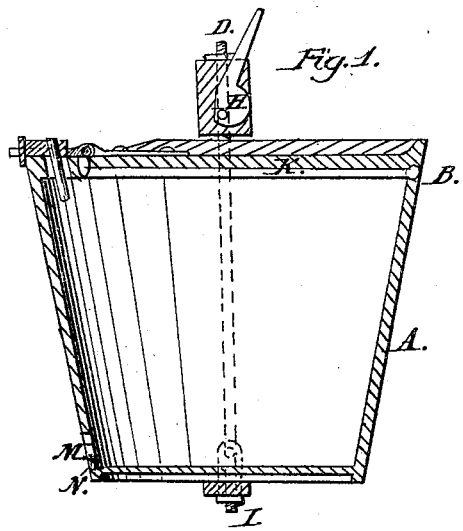
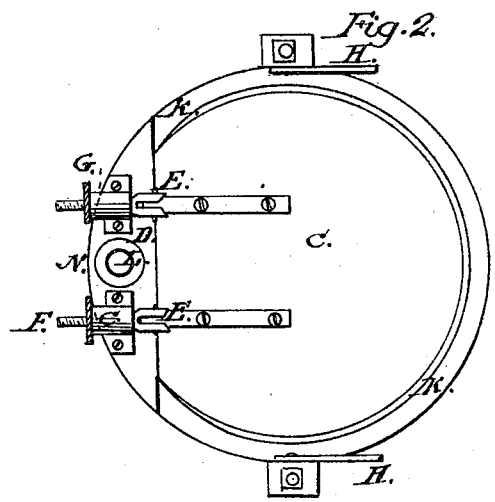
Witnesses:
Thos. A. Connolly
Edw. Mass.
Inventor:
J. R. Van Marter
pr Daniel Breed
atty.

JOSEPH R. VAN MARTER, OF LYONS, NEW YORK.

Letters Patent No. 89,449, dated April 27, 1869.

IMPROVEMENT IN STILLS.

The Schedule referred to in these Letters Patent and making part of the same.

*To all whom it may concern:*

Be it known that I, JOSEPH R. VAN MARTER, of Lyons, in the county of Wayne, and State of New York, have invented a new and useful Improvement in Stills; and I do hereby declare that the following is a full and exact description thereof, reference being had to the accompanying drawings, and to the letters of reference marked thereon.

My invention consists in a peculiar, novel arrangement of rubber packing, adjustable hinges, and other improvements in stills.

In the accompanying drawings—

Figure 1 is a vertical section of my improved still.

Figure 2 is a top view of the same.

Around the top of the tub, or vessel A, a groove is cut into the staves, and a cylindrical piece of rubber, B, is inserted into the groove, so that the pressure of the cover will come directly on this rubber, which thus serves as a packing to close the joint steam-tight.

The cover of the still is made in two parts, C and D, united by hinges E.

These hinges are made adjustable by means of screws, F, and nuts, G, so as to bring the proper pressure upon the rubber, as seen in fig. 1, which rubber closes the joint between the two parts of the cover.

By means of the eccentrics, or cams H and the hinged rods I, the cover is fastened steam-tight, the bearing of the cams being upon a rim, K, which serves to stiffen the cover, and bring the greatest pressure directly over the tops of the staves, and on the tubular packing thereon.

Around the tubes L and M, I use a rubber packing, N, which affords a steam-tight joint of the simplest construction.

Instead of the tubular rubber in a groove, a flat piece of rubber may be fastened upon the top of the staves, but I prefer the rubber in the groove, as above described. Also, sponge, or other elastic packing may be used as an equivalent of rubber, which I consider the best.

I do not claim the general arrangement of the still, and I do not broadly claim the use of rubber between the cover and tops of the staves, but confine my claim in this respect to the rubber, when inserted in the groove in the tops of the staves. All the other features claimed, I believe to be entirely new and an improvement on the stills now in use.

Having thus fully described my invention,

I claim—

1. The rubber packing, when inserted in a groove in the top of the staves, substantially as set forth.

2. The use of two hinges, to hold the cover from swinging on the top of the staves, and also the adjustability of the hinges, in combination with the rubber packing between the two parts of the cover, substantially as set forth.

3. The use of the eccentrics, or cams, for fastening the cover, substantially as described.

4. The rim upon the cover, for the purposes specified.

5. The rubber packing around the tubes, substantially as set forth.

JOSEPH R. VAN MARTER.

Witnesses:
DANIEL BREED,
EDM. F. BROWN.